(12) United States Patent
Yoshida

(10) Patent No.: US 7,664,312 B2
(45) Date of Patent: Feb. 16, 2010

(54) INFORMATION INPUT AND OUTPUT METHOD USING DOT PATTERN

(76) Inventor: Kenji Yoshida, 9-14-2302, Koishikawa 1-chome, Bunkyo-ku, Tokyo (JP) 112-0002

(*) Notice: Subject to any disclaimer, the term of this patent is extended or adjusted under 35 U.S.C. 154(b) by 772 days.

(21) Appl. No.: 10/583,995

(22) PCT Filed: Dec. 24, 2004

(86) PCT No.: PCT/JP2004/019427
§ 371 (c)(1),
(2), (4) Date: Jun. 22, 2006

(87) PCT Pub. No.: WO2005/064523
PCT Pub. Date: Jul. 14, 2005

(65) Prior Publication Data
US 2007/0164110 A1    Jul. 19, 2007

(30) Foreign Application Priority Data
Dec. 25, 2003  (WO) .................. PCT/JP03/16763

(51) Int. Cl.
*H04N 1/407* (2006.01)
*G06K 9/00* (2006.01)
(52) U.S. Cl. ..................... 382/151; 358/3.26
(58) Field of Classification Search ............... 712/711; 358/3.26, 3.27; 382/151, 168, 169, 178, 382/199
See application file for complete search history.

(56) References Cited

U.S. PATENT DOCUMENTS

| 5,221,833 A | 6/1993 | Hecht |
| 5,278,671 A * | 1/1994 | Takahashi et al. .......... 358/3.03 |
| 5,896,403 A | 4/1999 | Nagasaki et al. |
| 6,052,813 A | 4/2000 | Nagasaki et al. |
| 6,058,498 A | 5/2000 | Nagasaki et al. |

(Continued)

FOREIGN PATENT DOCUMENTS
EP    1605395 A1    12/2005

(Continued)

OTHER PUBLICATIONS

English translation of Russian Office Action dated Jul. 24, 2006 (filing date), issued in corresponding Application. No. 2006126975/09(029272).

(Continued)

*Primary Examiner*—Jerome Grant, II
(74) *Attorney, Agent, or Firm*—Westerman, Hattori, Daniels & Adrian, LLP

(57) ABSTRACT

Making a dot pattern so that misalignment in a x direction and a y direction is alternately generated for every adjacent information dots on a virtual grid line, the misalignment is alternately generated in the x direction and the y direction for each dot and this results in that the alternate information dot is necessarily arranged on the same grid line. Therefore, in the case that an optical reading apparatus reads the dot pattern, a search algorithm of a virtual grid line is simplified on an image memory. As a result, the grid point on the image memory is also easy. Therefore, without using a complicated program, it is possible to speed up the reading speed of the dot pattern.

7 Claims, 16 Drawing Sheets

U.S. PATENT DOCUMENTS

| | | | |
|---|---|---|---|
| 6,108,032 A * | 8/2000 | Hoagland | 348/144 |
| 6,460,155 B1 | 10/2002 | Nagasaki et al. | |
| 6,548,768 B1 | 4/2003 | Pettersson et al. | |
| 6,663,008 B1 | 12/2003 | Pettersson et al. | |
| 6,674,427 B1 | 1/2004 | Pettersson et al. | |
| 7,024,041 B2 * | 4/2006 | Sasa | 382/221 |
| 7,382,383 B2 * | 6/2008 | Shiomi et al. | 345/690 |

FOREIGN PATENT DOCUMENTS

| | | |
|---|---|---|
| JP | 10-187907 A | 7/1998 |
| JP | 2003-511761 A | 3/2003 |
| SU | 1791831 A1 | 1/1993 |
| WO | WO 01/26032 A1 | 4/2001 |

OTHER PUBLICATIONS

European Search Report dated Aug. 7, 2008, issued in corresponding European Patent Application No. 04807783.8.

Russian Office Action dated Dec. 24, 2004, issued in corresponding Russian Patent Application No. 2006126975.

International Search Report mailed Apr. 12, 2005 of International Application PCT/JP2004/019427.

Translation of International Preliminary Report on Patentability issued Aug. 22, 2006, of International Application No. PCT/JP2004/019427.

* cited by examiner

FIG. 5

| | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| INFORMATION BIT | 1 | 0 | 0 | 1 | 1 | 1 | 1 | 0 | 1 | 0 | 1 | 1 | 1 | 0 |
| | $K_1$ | $K_2$ | $K_3$ | $K_4$ | $K_5$ | $K_6$ | $K_7$ | $K_8$ | $K_9$ | $K_{10}$ | $K_{11}$ | $K_{12}$ | $K_{13}$ | $K_{14}$ |
| SECURITY TABLE | 0 | 0 | 1 | 0 | 1 | 1 | 0 | 1 | 1 | 0 | 0 | 0 | 1 | 1 |
| | $T_1$ | $T_2$ | $T_3$ | $T_4$ | $T_5$ | $T_6$ | $T_7$ | $T_8$ | $T_9$ | $T_{10}$ | $T_{11}$ | $T_{12}$ | $T_{13}$ | $T_{14}$ |
| TRUE VALUE | 1 | 0 | 1 | 1 | 0 | 0 | 1 | 1 | 0 | 0 | 1 | 1 | 0 | 1 |

$\Delta\theta, \Delta\theta' \leq \tan^{-1}0.4$
$2.4 \leq L_1^2/L_s^2, L_1'^2/L_s'^2 \leq 7.0$

| ⬜1 = ⑤ − ① | ⬜8 = ⑫ − ⑧ |
| ⬜2 = ⑥ − ② | ⬜9 = ⑬ − ⑨ |
| ⬜3 = ⑦ − ③ | ⬜10 = ⑭ − ⑩ |
| ⬜4 = ⑧ − ④ | ⬜11 = ⑮ − ⑪ |
| ⬜5 = ⑨ − ⑤ | ⬜12 = ⑯ − ⑬ |
| ⬜6 = ⑩ − ⑥ | ⬜13 = ⑰ − ⑭ |
| ⬜7 = ⑪ − ⑦ | ⬜14 = ⑱ − ⑮ |

FIG. 18

| INFORMATION BIT | 1 | 0 | 0 | 1 | 0 | 0 | 0 | 0 | 0 | 1 | 0 | 0 | 1 | 1 |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |

| SECURITY TABLE | 0 | 0 | 1 | 0 | 1 | 1 | 0 | 1 | 1 | 0 | 0 | 0 | 1 | 1 |
|---|---|---|---|---|---|---|---|---|---|---|---|---|---|---|
| | K1 | K2 | K3 | K4 | K5 | K6 | K7 | K8 | K9 | K10 | K11 | K12 | K13 | K14 |

| TRUE VALUE | 1 | 0 | 1 | 1 | 1 | 1 | 0 | 1 | 1 | 1 | 0 | 0 | 0 | 0 |
|---|---|---|---|---|---|---|---|---|---|---|---|---|---|---|
| | T1 | T2 | T3 | T4 | T5 | T6 | T7 | T8 | T9 | T10 | T11 | T12 | T13 | T14 |

INFORMATION INPUT AND OUTPUT METHOD USING DOT PATTERN

FIELD OF THE INVENTION

The present invention relates to an information input and output method using a dot pattern.

DESCRIPTION OF RELATED ART

Conventionally, an information input and output method for reading a bar code printed on a printed matter or the like and outputting the information such as a voice has been suggested. For example, a method for outputting the information or the like in such a manner that the information coinciding with the key information (a code of plural digits) has been stored in storage means in advance and this information is retrieved from keys read by a bar code reader to be outputted has been suggested. In addition, a technology such that a dot pattern having fine and thin dots arranged in a predetermined rule is generated, the dot pattern printed on a printed matter or the like is fetched by a camera as the image data, and the image data is digitized to output the voice information so as to output much information and many programs has been also suggested.

However, the above-described conventional method for outputting the voice or the like using the bar code involves a problem such that the bar code printed on the printed matter or the like is obstructive. Further, the bar code is so large that it occupies a part of a page space. Therefore, in the case of using this for a book or the like, this method involves problems such that the large bar code destroys beauty of the page space to be printed; there is no space for displaying the bar codes when a user wishes to allocate many bar codes in an easily understood manner for a portion of writing and a sentence or each character or object having a meaning to appear on the image of a photograph, a picture, and a graphic; and it is not possible to display the bar codes for layout of the page space.

In view of these points, as disclosed in Japanese Patent Application National Publication (Laid-Open) No. 2003-511761 (Patent Document 1) and Japanese Patent Application Laid-Open (JP-A) No. 10-187907 (Patent Document 2), a technology for obtaining the key information (the code) and a coordinate value on the page space by forming a dot pattern on the page space according to a predetermined rule and reading this dot pattern optically is suggested.

However, in the case of giving a meaning such as the key information to the dot pattern indicated in the patent document 1 or 2, the arrangement density distribution of such a dot pattern is eccentrically located in many cases. Therefore, it is feared that the dot pattern is represented as a print on the page space to influence beauty of a picture and a photograph to be printed overlapped with the dot pattern.

In addition, if such a dot pattern gets to be widely used, the dot pattern is formed on the printed matter for daily use and the surface of a commercial good, and it seems that the optical reading means for this gets to be also widely used and inexpensive. However, the conventional dot pattern system involves a problem such that a sophisticated technology for correcting a distortion in the dot pattern is required because a distortion is generated on the imaged dot pattern when the surface of the medium such as a page space of the dot pattern or the like is expanded and contracted or curved in consequence of a temperature and a humidity or the like of a daily life and the dot pattern is distorted due to a printing technology itself; when a reading apparatus using a lens with a low degree of machining accuracy is utilized; and further when the imaged dot pattern is distorted because of a reading direction of the reading means (for example, an oblique direction with an optical axis displaced from a vertical direction with respect to the page space).

SUMMARY OF THE INVENTION

The present invention relates to an information input and output method using a dot pattern.

According to a first aspect of the present invention, there is provided an information input and output method;

wherein an optical reading apparatus reads a dot pattern which is formed on a medium and in which information dots are arranged being misaligned at predetermined intervals in a x direction or a y direction from a grid point on a virtual grid line provided at predetermined intervals in a xy direction;

the optically read dot pattern is deployed on an image memory;

how to misalign each information dot from the grid point into the x direction or the y direction is recognized by a bit map calculation on the image memory;

a value is given to each information dot corresponding to the misalignment;

a difference of the values among the adjacent information dots is calculated to be defined as the bit information; and a dot pattern is used, which outputs a bit information group in a predetermined area as the coordinate information or the code information.

According to the present invention, since all of the information dots are arranged in the vicinity of the grid point, the arrangement density distribution of the dot pattern is not located eccentrically, the dot pattern is not represented as a print on the page space; and the dot pattern does not influence the beauty of a printed page space of a picture and a photograph to be printed overlapped with the dot pattern.

According to a second aspect of the present invention, there is provided the information input and output method using a dot pattern according to the first aspect, wherein the misalignment at predetermined intervals from each grid point in the x direction or the y direction on the virtual grid line is alternately generated for every adjacent information dots.

Thus, since misalignment is generated for every adjacent information dots on the grid line in the x and y directions alternately, every other information dot is inevitably arranged on the same grid line. Therefore, when the dot pattern is read by the optical reading apparatus, a search algorithm of the virtual grid line becomes simple on the image memory, and as a result, search of the grid point on the image memory also becomes easy. As a result, without using a complicated program, it is possible to make the reading speed of the dot pattern into a high speed.

Further, even if a distortion is generated on the imaged dot pattern when the surface of the page space of the dot pattern or the like is expanded and contracted or curved in consequence of a temperature and a humidity or the like of a daily life and the dot pattern is distorted due to a printing technology itself; when a reading apparatus using a lens with a low degree of machining accuracy is utilized; and further when the imaged dot pattern is distorted because of a reading direction of the reading means (for example, an oblique direction with an optical axis displaced from a vertical direction with respect to the page space), a complicated correction algorithm is not necessary since the virtual grid line is not a straight line but a gentle curve, so that search is easy.

According to a third aspect of the present invention, there is provided the information input and output method using a dot pattern according to the first aspect, having a corner dot arranged on a grid point for each of the predetermined number of grid areas; and registering the coordinate information or the code information in the area encircled by the corner dot as the predetermined area.

By using the corner dot, a storage unit of the information can be defined. As this region unit, for example, 4 grid blocks×4 grid blocks=16 blocks can be established. The vicinity of the grid point within this 16 blocks can be a position where the information dot is arranged.

According to a fourth aspect of the present invention, there is provided the information input and output method using a dot pattern according to the third aspect, wherein a vector dot meaning the direction of the predetermined area is arranged outside of the area encircled by the corner dot or on the grid point in the area.

By arranging this vector dot, the dot pattern is read as being rotated in ±90 degrees or 180 degrees, so that in any direction of upper, lower, right, and left directions, the code indicated by the dot pattern can be read.

Further, by adding the direction information using the vector dot, the output can be varied depending on the reading direction even in the same dot pattern.

According to a fifth aspect of the present invention, there is provided the information input and output method using a dot pattern according to the first aspect to the fourth aspect, wherein a security table having a key parameter corresponding to each bit stored therein is provided in a storage apparatus with respect to the outputted bit information group, and a true value is calculated by calculating each bit information by the key parameter.

By using such a security table, it can be prevented that the code information and the coordinate information it means is analyzed by a third person only from the reading result (the bit information) of the dot pattern.

According to a sixth aspect of the present invention, there is provided an information input and output method;

wherein an optical reading apparatus reads a dot pattern which is formed on a medium and in which information dots are arranged being misaligned at predetermined intervals in a x direction or a y direction for each of the adjacent grid points on a virtual grid line provided at predetermined intervals in a xy direction;

the optically read dot pattern is deployed on an image memory;

the alternately arranged information dots are searched and the grid line in the x direction and the y direction is recognized on a bit map;

a coordinate of each grid point is recognized on the bit map;

how to misalign each information dot from the grid point into the x direction or the y direction is recognized by a bit map calculation;

a value defined in advance is given to each information dot corresponding to the misalignment;

a difference of the values among the adjacent information dots is calculated to be defined as the bit information;

a bit information group in a predetermined area is outputted;

a key parameter is read from a security table having the key parameter corresponding to each bit stored therein with respect to the bit information group, and a true value group is calculated by calculating each bit information by the key parameter; and a dot pattern outputting the code information corresponding to the true value group or the coordinate information group on the medium surface is used.

According to a seventh aspect of the present invention, there is provided a dot pattern generating method;

wherein information dots are arranged being misaligned at predetermined intervals in a x direction or a y direction for every adjacent grid points on a virtual grid line provided at predetermined intervals in a xy direction on a medium;

a bit information group is calculated by calculating a key parameter read from a security table with respect to a true value group;

an initial dot to be arranged on an initial grid line in the x direction or the y direction is decided by using an arbitrary random number;

the initial dot is arranged on the basis of a misalignment rule from the grid point set in advance;

the bit information value is added to the value meant by the initial dot to calculate a value of a dot to be arranged on a second grid line;

each dot is arranged on the second grid line on the basis of the misalignment rule from the grid point set in advance; and arrangement of a dot on a grid line n is repeated by rotation on the basis of a dot on a grid line n−1.

According to the information input and output method using the dot patterns described in claims 1 to 7 of the present invention, the arrangement density distribution of the dot pattern is not located eccentrically. Therefore, it is not feared that the dot pattern is represented as an ugly print on the page space and the dot pattern influences the beauty of a picture and a photograph to be printed overlapped with the dot pattern.

In addition, even if a distortion is generated on the imaged dot pattern when the surface of the medium such as a page space of the dot pattern or the like is expanded and contracted or curved and the dot pattern is distorted due to a printing technology itself; when a reading apparatus using a lens with a low degree of machining accuracy is utilized; and further when the imaged dot pattern is distorted because of a reading direction of the reading means (for example, an oblique direction with an optical axis displaced from a vertical direction with respect to the page space), without a complicated correction algorithm, the virtual grid line can be easily searched. Therefore, the dot pattern can be accurately recognized at a high speed without being influenced by a surface of a medium and a reading condition.

By applying the dot pattern according to the present invention to the input means of a personal computer and an information processing unit or the like, this input means can be a substitute for a conventional mouse, a tablet and a digitizer or the like, and this provides innovative changes to the input system.

In this case, the dot pattern may mean the specific code information, or the dot pattern may be a numeric value meaning the xy coordinate.

BRIEF DESCRIPTION OF THE DRAWINGS

FIG. 5 is an explanatory view of a relation among an information bit, a security table, and a true value;

FIG. 18 is an explanatory view of a relation among an information bit, a security table, and a true value in FIG. 17.

DETAILED DESCRIPTION OF THE INVENTION

The embodiment of the present invention will be described below with reference to the attached drawings.

(Basic Principle of Dot Pattern)

The basic principle of the dot pattern according to the present embodiment will be described with reference to FIG. 1.

Figure 1:
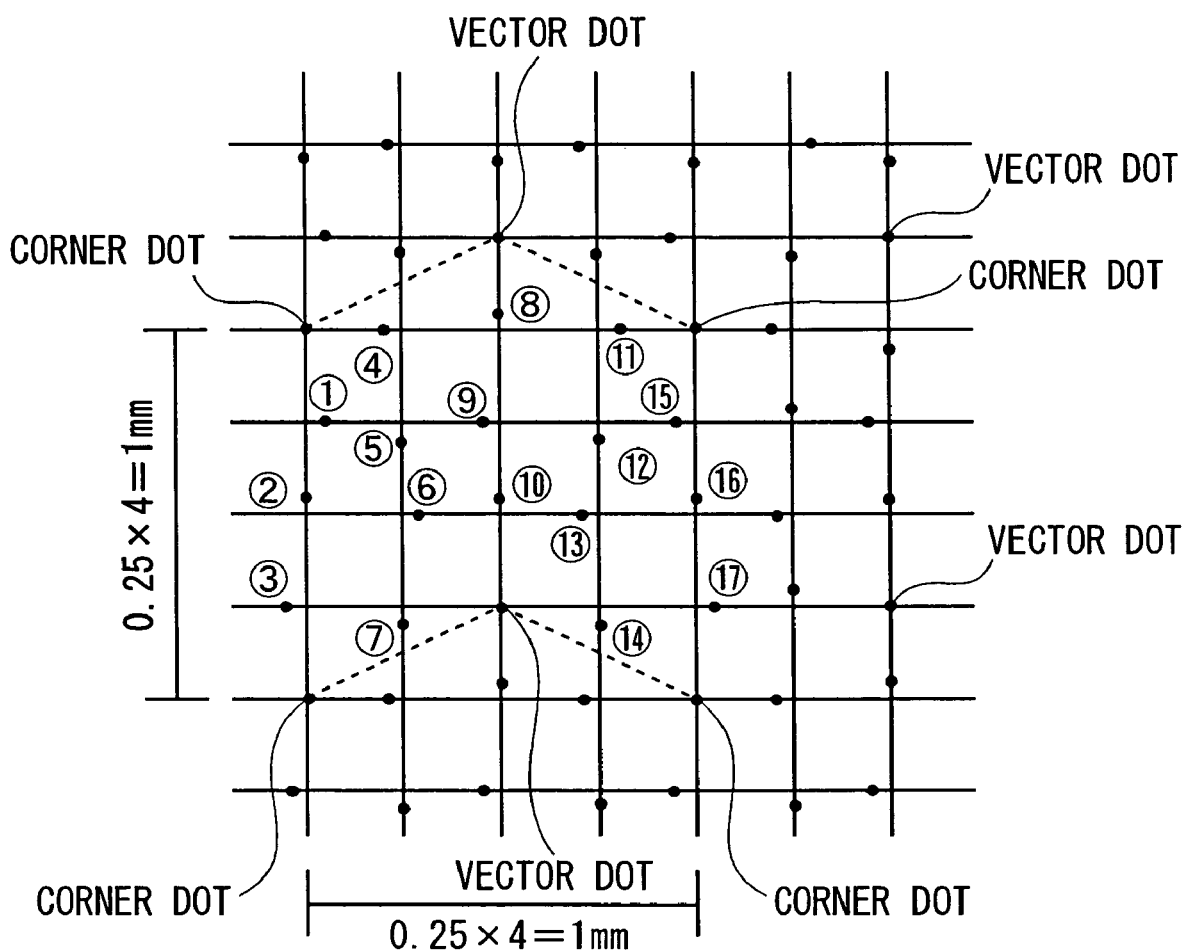
FIG. 1 is an explanatory view of a method for arranging a dot pattern according to the present embodiment.

At first, as shown in FIG. 1, the grid lines (y1-y7, x1-x5) are supposed at predetermined intervals in a xy direction. An intersecting point of this grid line is called as a grid point. Then, in the present embodiment, as the minimum block (namely, one block) encircled by these four grid points, four blocks (four grids) in the xy direction, namely, 4×4=16 blocks (16 grids) are defined as one information block. Further, only as one example, this information block unit is made of 16 blocks, and it is obvious that any number of blocks can configure the information block.

Then, four angular points configuring a rectangular area of this information block are defined as corner dots (x1y1, x1y5, x5y1, x5y5; namely, the circled dot in the drawing). These four corner dots are made to coincide with the grid points.

Thus, by finding four corner dots coinciding with the grid point, the information block can be recognized. However, only by this corner dot, the information block can be recognized but the direction of the information block is not known. For example, when the direction of the information block is not recognized, even the same information block is made into entirely different information if this information block that is rotated by ±90 degrees or 180 degrees is scanned.

Therefore, a vector dot (a key dot) is arranged at the grid point inside of the rectangular area of the information block or within the adjacent rectangular area. In the drawing, a dot (x0y3) encircled by a triangle is a vector dot. The key dot (the vector dot) is arranged at the first grid point vertically upward from the middle point of the grid line configuring the upper side of the information block. As the same as this, the key dot of the lower information block is arranged at the first grid point (x4y3) vertically upward from the middle point of the grid line configuring the lower side of the information block.

Further, according to the present embodiment, a distance between the grid points (inter-grid distance) is defined as 0.25 mm. Accordingly, one side of the information block become 0.25 mm×4 grids=1 mm. Then, this area becomes 1 mm×1 mm=1 mm². It is possible to store the information of 14 bits in this range. Using this inside 2 bits as the control data leads to that the information for 12 bits can be stored. It is merely an example that the inter-grid distance is 0.25 mm, and for example, the distance can be freely changed in the range of 0.25 to 0.5 mm or more.

(Arrangement Principle of Information Dot)

The information dots are alternately arranged being misaligned in the x direction and the y direction from the grid point. The diameter of the information dot is preferably in the range of 0.03 to 0.05 mm or more, and the amount of misalignment from the grid point is preferably about 15 to 25% of the inter-grid distance. Since this range of the amount of misalignment is an example, it is not always necessary that the amount of misalignment is in this range, however, when the amount of misalignment is larger than 25%, it is a general trend that the dot pattern easily appears as a print when checking the dot with eyes.

In other words, since the grid points are misaligned alternately in a vertical direction (in the y direction) and in a horizontal direction (the x direction), the arrangement distribution of the dot is not eccentrically located. As a result, the dots do not appear on the page space as a moire and a print so that beauty of the page space can be kept.

Figure 2:
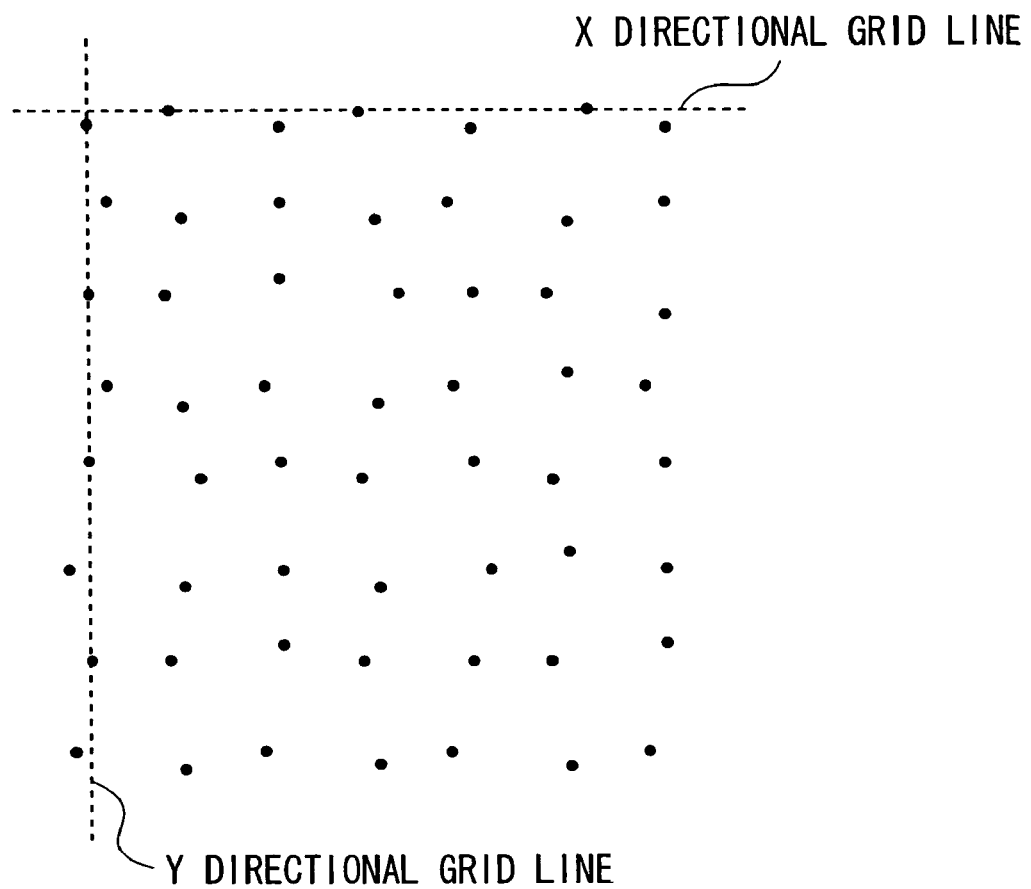
FIG. 2 is a view showing a relation between the dot and a grid line according to the present embodiment.

By employing such an arrangement principle, the information dots are always arranged on the grid line in the y direction alternately (refer to FIG. 2). This leads to that the grid line linearly arranged in the y direction or the x direction alternately may be found when reading the dot pattern, so that this has an advantage such that a calculation algorithm in the information processing unit upon recognition can be simplified and speeded up.

In addition, even in the case that the dot pattern is transformed due to curvature of the page space or the like, the grid line may not be a straight line but a gentle curve like a straight line and it is relatively easy to find the grid line. Therefore, it can be said that this algorithm is strong in the modification of the page space and the misalignment and distortion of the reading optical system.

Figure 3:
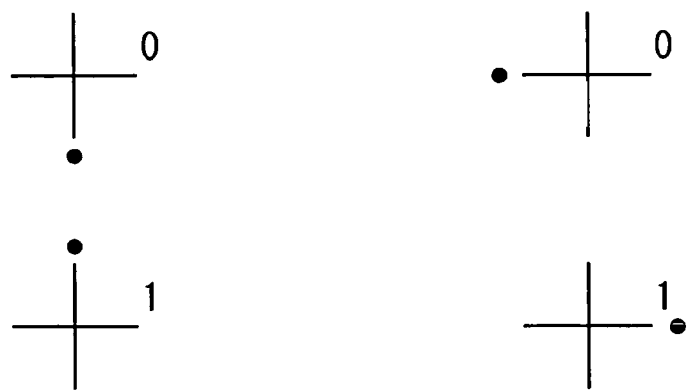
FIG. 3 is a view showing a mode of misalignment of an information dot from a grid point.

The meaning of the information dot is described in FIG. 3. In FIG. 3, + indicates a grid point and a black circle indicates a dot (an information dot). The case that the information dot is arranged in a −y direction relative to the grid point is defined as 0; the case that the information dot is arranged in a +y direction is defined as 1; the case that the information dot is arranged in a −x direction relative to the grid point is defined as 0; and the case that the information dot is arranged in a +x direction is defined as 1.

Next, with reference to FIG. 4, the arrangement state of the information dot and the reading algorithm will be described below.

In the drawing, the information dot of a circled numeral 1 (hereinafter, called as the information dot (1)) is misaligned from the grid point (x2y1) in the +x direction, this information dot means "1". In addition, since an information dot (2) (in the drawing, the circled numeric value) is misaligned from the grid point (x3y1) in the +y direction, this information dot means "1". Further, since an information dot (3) (in the drawing, the circled numeric value) is misaligned from the grid point (x4y1) in the −x direction, this information dot means "0", an information dot (4) (the circled numeric value in the drawing) means "0", and an information dot (5) means "0", respectively.

Figure 4:
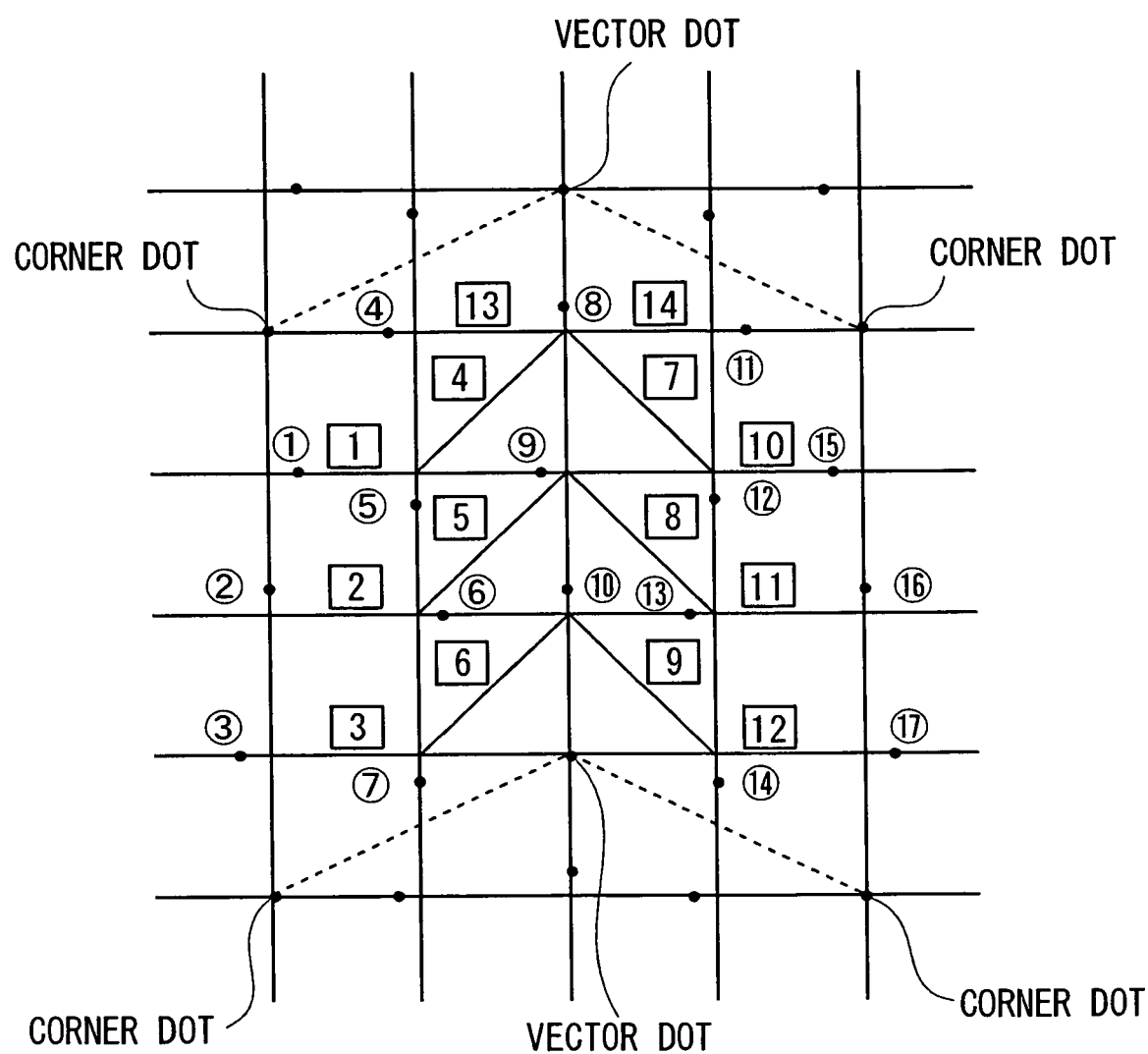
FIG. 4 is a dot pattern view for explaining the acquisition of the information-due to a difference.

In the case of the dot pattern shown in FIG. 4, the information dots (1) to (17) take the following values.

(1)=1
(2)=1
(3)=0
(4)=0
(5)=0
(6)=1
(7)=0
(8)=1
(9)=0
(10)=1
(11)=1
(15)=0
(16)=1
(17)=1

According to the present embodiment, the value of the information bit is calculated by using an information acquisition algorithm due to a difference method to be described below, however, this information dot may be outputted as the information bit as it is. In addition, a true value may be calculated by calculating a value of a security table to be described later for this information bit.

(Information Acquisition Algorithm by Difference Method)

Next, with reference to FIG. 4, an information acquisition method applying the difference method on the basis of the dot pattern according to the present embodiment will be described below.

Further, in the description of the present embodiment, a figure encircled by ( ) denotes a circled figure in the drawing, and a figure encircled by [ ] denotes a figure encircled by a square in the drawing.

According to the present embodiment, each value of 14 bits within the information block is represented by a difference of the adjacent information dots. For example, the first bit can be obtained from the difference between the information dot (1) and the information dot (5) located +one grid from the information dot (1) in the x direction. In other words, [1]=(5)−(1) is established. Here, the information dot (5) denotes "1" and the information dot (1) denotes "0", so that the first bit [1] means "1−0", namely, "1". In the same way, the second bit [2] is represented by [2]=(6)−(2), and the third bit [3] is represented by [3]=(7)−(3). The first to third bits are as follows.

Further, in the following difference formulas, it is defined that the value takes an absolute value.

[1]=(5)−(1)=0−1=1

[2]=(6)−(2)=1−1=0

[3]=(7)−(3)=0−0=0

Next, the fourth bit [4] will be obtained from the difference between the information dot (8) just below the vector dot and the information dot (5). Accordingly, with respect to the fourth bit [4] to the sixth bit [6] the difference between the value of the information dot located one grid in the +x direction and the value of information dot located one grid in the +y direction is obtained.

In this way, the fourth bit [4] to the sixth bit can be obtained by the following formulas.

[4]=(8)−(5)=1−0=1

[5]=(9)−(6)=0−1=1

[6]=(10)−(7)=1−0=1

Next, with respect the seventh bit [7] to the ninth bit [9], the difference from the value of the information dot located one grid in the +x direction and the value of information dot located one grid in the −y direction is obtained.

In this way, the seventh bit [7] to the ninth bit [9] can be obtained by the following formulas.

[7]=(12)−(8)=0−1=1

[8]=(13)−(9)=0−0=0

[9]=(14)−(10)=0−1=1

Next, with respect the tenth bit [10] to the twelfth bit [12], the difference from the value of the information dot located one grid in the +x direction is obtained and the tenth bit [10] to the twelfth bit [12] can be obtained by the following formulas.

[10]=(15)−(12)=0−=0

[11]=(16)−(13)=1−=1

[12]=(17)−(14)=1−=1

At last, with respect to the thirteenth bit [13] and the fourteenth bit [14], the difference between the information dot (8) and the value of the information dots located +one grid and −one grid in the x direction are obtained, respectively, and they can be obtained as follows.

[13]=(8)−(4)=1−0=1

[14]=(11)−(8)=1−1=0

Further, the first bit [1] to the fourteenth bit [14] may be employed as a true value as they are and function as reading data. However, in order to ensure a security, providing a security table corresponding to this 14 bits, defining a key parameter corresponding to each bit, and adding and multiplying the key parameter to and by the reading data, the true value may be obtained.

In this case, a true value T can be obtained by the formula of Tn=[n]+Kn (n:1 to 14, Tn: a true value, [n]: a reading value, Kn: a key parameter). Such a security table having the key parameter stored therein can be registered in a ROM within the optical reading apparatus.

For example, assuming the following key parameters as the security table, $K_1$=0
$K_2$=0
$K_3$=1
$K_4$=0
$K_5$=1
$K_6$=1
$K_7$=0
$K_8$=1
$K_9$=1
$K_{10}$=0
$K_{11}$=0
$K_{12}$=0
$K_{13}$=1
$K_{14}$=1 true values T1 to T14 can be obtained as follows, respectively.

$T_1$=[1]+$K_1$=1+0=1

$T_2$=[2]+$K_2$=0+0=0

$T_3$=[3]+$K_3$=0+1=1

$T_4$=[4]+$K_4$=1+0=1

$T_5$=[5]+$K_5$=1+1=0

$T_6$=[6]+$K_6$=1+1=0

$T_7=[7]+K_7=1+0=1$ $T_8=[8]+K_8=0+1=1$ $T_8=[9]+K_9=1+1=0$ $T_{10}=[10]+K_{10}=0+0=0$ $T_{11}=[11]+K_{11}=1+0=1$ $T_{12}=[12]+K_{12}=1+0=1$ $T_{13}=[13]+K_{13}=1+1=0$ $T_{14}=[14]+K_{14}=0+1=1$

The relation between the above-described information bit, the security table, and the true value will be shown in FIG. 5.

In the above description, the case that the information bit is obtained from the other information bit and the true value is obtained with reference to the security table is explained, however, in the case of generating a dot pattern from the true value on the contrary to this, the value of the nth bit [n] can be obtained by the formula of $[n]=T_n-K_n$.

Here, as an example, in the case of T1=1, T2=0, T3=1, the first bit [1] to the third bit [3] will be obtained from the following formulas.

$[1]=1-0=1$ $[2]=0-0=0$ $[3]=1-1=0$

Then, the first bit [1] to the third bit [3] are represented by the following difference formula.

$[1]=(5)-(1)$ $[2]=(6)-(2)$ $[3]=(7)-(3)$

Here, giving an initial value such as (1)=1, (2)=1, (3)=0, the dots (5) to (7) can be obtained as follows.

$(5)=(1)+[1]=1+1=0$ $(6)=(2)+[2]=1+0=1$ $(7)=(3)+[3]=0+0=0$

The explanation is herein omitted, however, the values of the dots (8) to (14) can be obtained in the same way. On the basis of these values, the dots may be arranged.

The initial values of the dots (1) to (3) are arbitrary random number (0 or 1).

In other words, by adding the values of the information bits [1] to [3] to the allocated initial dots (1) to (3), the values of the dots (5) to (7) arranged on the next y directional grid line can be obtained. In the same way, by adding the values of the information bits [4] to [6] to the values of the dots (5) to (7), the values of the dots (8) to (10) can be obtained. Further, by adding the values of the information bits [7] to [9] to the values of the dots (8) to (10), the values of dots (12) to (14) can be obtained. Further, by adding the values of the information bits [10] to [12] to the values of the dots (12) to (14), the values of dots (15) to (17) can be obtained.

Further, the values of the dots (4) and (11) can be obtained, respectively, by subtracting the information bit [13] from them or adding the information bit [14] to them on the basis of the calculated dot (8) in the above description.

As mentioned above, according to the present embodiment, the arrangement of the dot on a grid line yn is decided on the basis of the dot arrangement on the grid line y (n−1), and by repeating this sequentially, the entire arrangement of the information dot can be decided.

(Dot Pattern Reading Procedure in Optical Reading Apparatus)

(Step 1)

Figure 6:
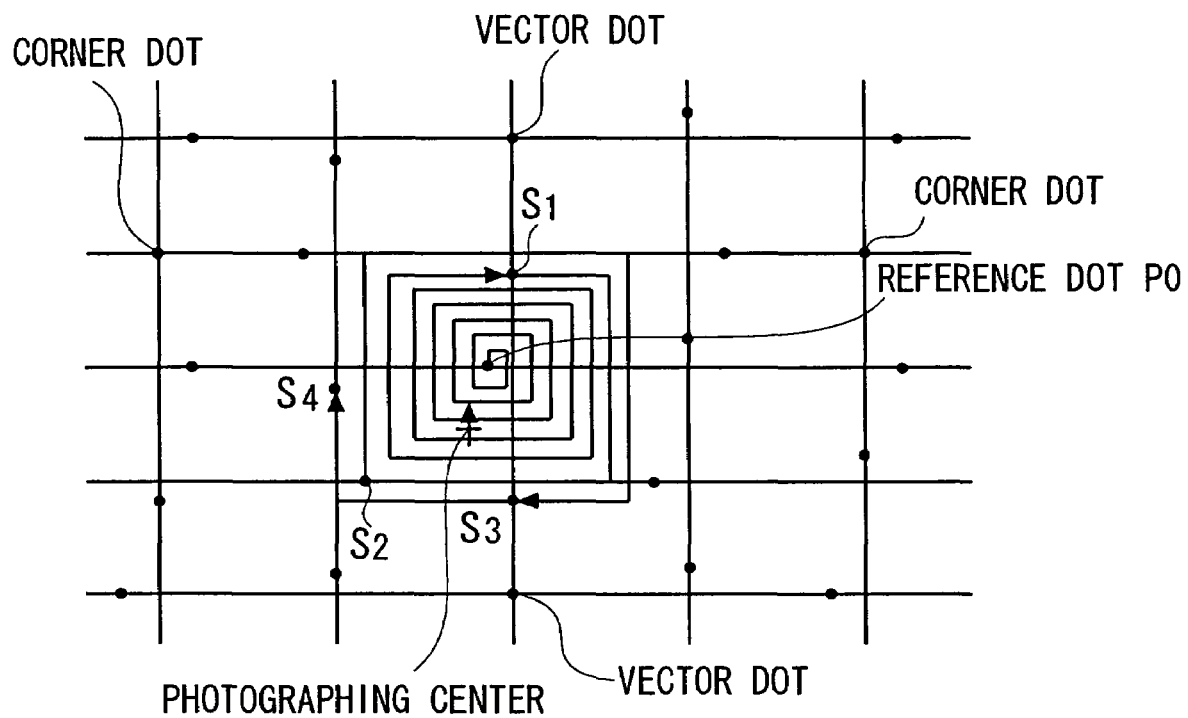
FIG. 6 is an explanatory view (1) of a reading algorithm of the dot pattern.

As shown in FIG. 6, the data read by an optical reading apparatus 801 (refer to FIG. 8) is bitmap-deployed on a VRAM (an image memory), and a two-valued dot on the image memory is searched from the center of photographing in a spiral. The dot that has been found at first is defined as a reference dot $P_0$.

(Step 2)

Next, the presence or absence of the dot is retrieved in a clockwise spiral from the reference dot $P_0$. Then, the following determination is carried out with respect to the dot found here. If this dot does not meet the condition, returning to (the step 2), the dot that is an inspection object next to the spiral direction will be searched from the dots that have been searched so far.

(Step 3)

Measuring an angle θ made the direction of the dot of the inspection object from the reference dot $P_0$ by the vertical direction of the center of photographing and a distance L from the reference dot $P_0$, the dots are registered on a table disposed on the memory by rotation from that of the shorter distance from the reference dot. Every time a new dot is found, the rotation is sorted because the dot is searched in a square centering on the reference dot $P_0$ in the case of searching the dot in a spiral and the lately searched dot may have a shorter distance. FIG. 6 shows an example that the dot pattern is modified into an oblong when the optical reading apparatus 801 is inclined to read the dot pattern from the oblique direction with respect to the vertical line against the reading surface.

(Step 4)

Figure 7:
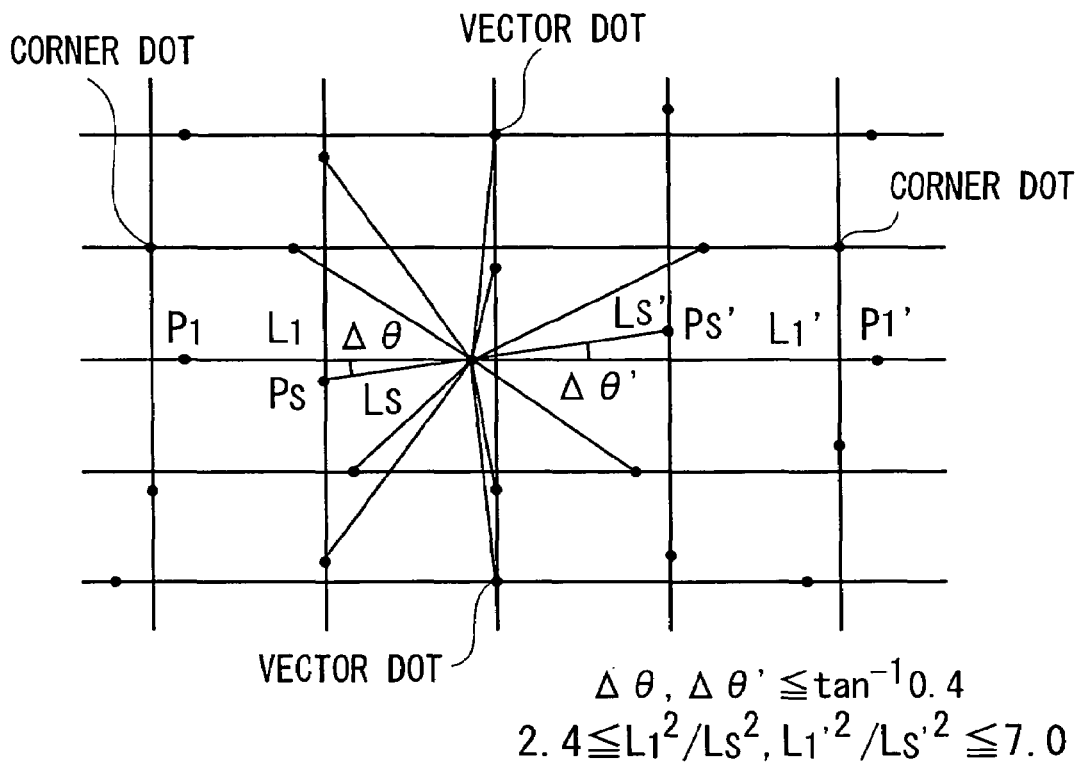
FIG. 7 is an explanatory view (2) of the reading algorithm of the dot pattern.

A difference of the angle (namely, a black triangle θ) between a new inspection object dot P1 and a dot Ps registered in the table in advance will be calculated (refer to FIG. 7)

(Step 5)

In the step 4, if a black triangle θ is larger than $\tan^{-1}0.4$, the operation is returned to (the step 1).

Figure 8:
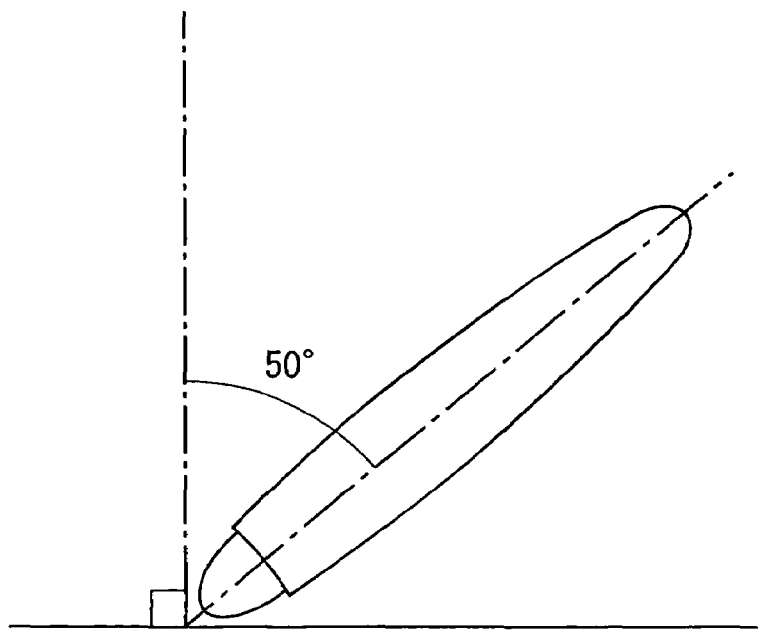
FIG. 8 is an explanatory view of a method for reading the dot pattern using an optical reading apparatus.

Further, $\tan^{-1}0.4$ (=21.8°) is an angle made by the adjacent dot centering around the reference dot in the grid line direction and the further adjacent dot in the case the optical reading apparatus 801 takes a photograph of the dot pattern being inclined at 50° (FIG. 8).

(Step 6)

In the step 4, if a black triangle θ is not more than $\tan^{-1}0.4$, assuming that a distance to the registered (shorted) dot Ps is Ls and a distance to the inspection object (longer) dot P1 is L1, if $2.4 > L1^2/Ls^2$, $7.0 < L1^2/Ls^2$, raising a flag out of the inspection object on the table at P1, the operation is returned to (the step 2).

Further, in the case of taking a photograph of the dot pattern at the angle of 50°, $2.4 \leq L1^2/Ls^2 \leq 7.0$ is a proportion of a square of the distance from the adjacent dot from the reference dot to the further adjacent dot in the grid line direction on which the reference dot is mounted.

(Step 7)

In the step 6, if $2.4 \leq L1^2/Ls^2 \leq 7.0$ is established, a dot Ps' having the shortest distance from the reference dot $P_0$ within the range that the angle $\theta'$ with respect to a contrary direction of P1 from the reference dot $P_0$ is represented by a black triangle $\theta' \leq \tan^{-1} 0.4$ is searched.

(Step 8)

If no dot is found in the step 7, raising a flag out of the inspection object at P1 on the table, the operation is returned to (the step 2).

(Step 9)

In the case that a dot is found in the step 7, searching a dot P1' further from Ps' in a contrary direction of P1 from the reference dot $P_0$ (the step 6) if the dot meets the condition of (the step 7), P1-$P_0$-P1' is made into a candidate for the reference first directional grid line. If no dot is found, raising a flag out of the inspection object at P1 on the table, the operation is returned to (the step 2).

(Step 10)

After finding the candidate for the reference first directional grid line, P1-$P_0$-P1', in order to select ten dots of the shortest distance from the reference dot, a total of fifteen dots is searched continuously from the next dot of the dot P1 centering around the reference dot $P_0$ in a spiral so as to measure the distance from the reference dot $P_0$, and then, the searched dots are registered on a table disposed on the memory by rotation from that of the shorter distance from the reference dot. The extra dots are searched because of the same reasons as that of (the step 3).

(Step 11)

In a clockwise direction from P1 to P1' and a counterclockwise direction from P1 to P1' centering around the reference dot $P_0$ with respect to the candidate for the reference first directional grid line, P1-$P_0$-P1', five dots of the shortest distance from the reference dot $P_0$ in the both directions except Ps, Ps' are selected, respectively.

(Step 12)

Figure 9:
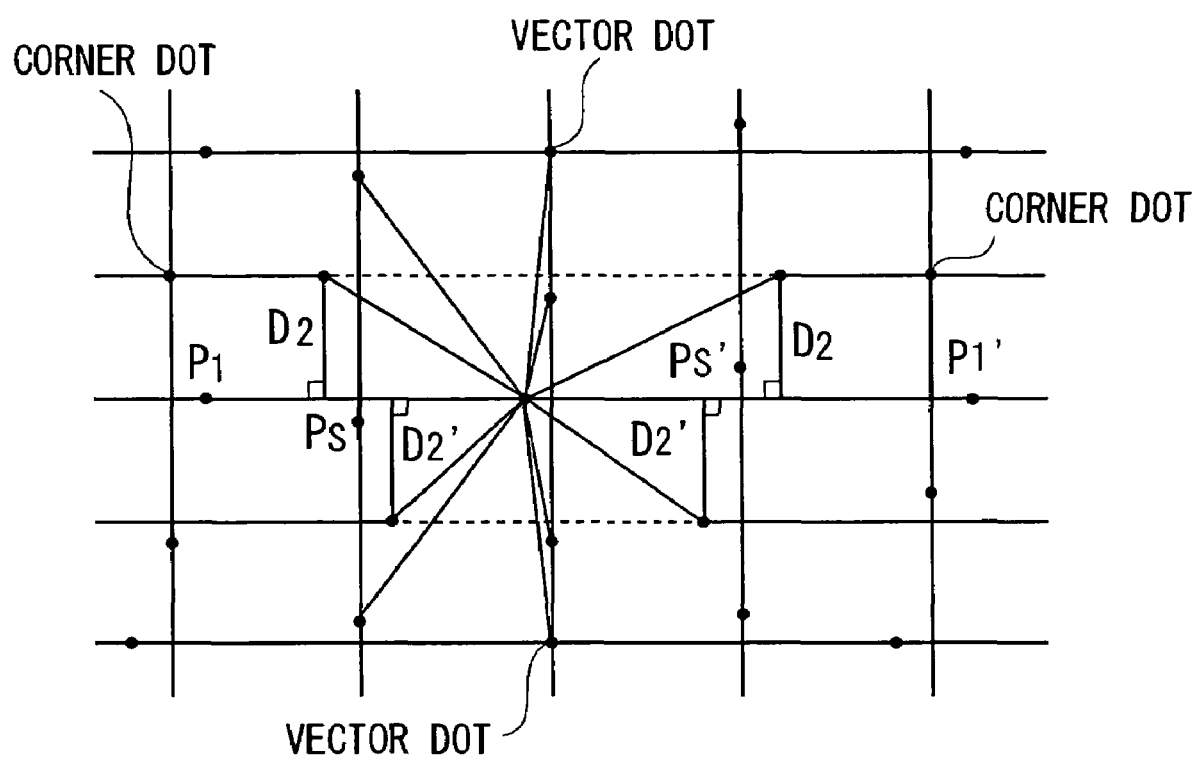
FIG. 9 is an explanatory view (3) of the reading algorithm of the dot pattern.

Omitting the dot of the shortest distance from the reference dot $P_0$ within five dots and measuring the distance from the remaining four dots to the reference dot $P_0$ to P1-$P_0$-P1', a line connecting two dots having the equal distances becomes a candidate for a quasi-first directional grid line, and the distance (namely, the inter-line distance) becomes a second directional inter-line distance $D_2$. However, in the case that there are two sets of two dots having the equal distance to the reference dot $P_0$ to P1-$P_0$-P', the two dots of the shorter distance are selected (refer to FIG. 9).

(Step 13)

In the former step 12, when two dots having the equal distance to P1-$P_0$-P1' are not found within four dots, raising a flag out of the inspection object at P1 and P1' on the table, the operation of the steps 4 to 15 is carried out with respect to the next inspection object dot. However, since the dot on which the flag out of the inspection object is standing does not form the reference first directional grid line, this dot is not made into that of the inspection object.

(Step 14)

Figure 10:
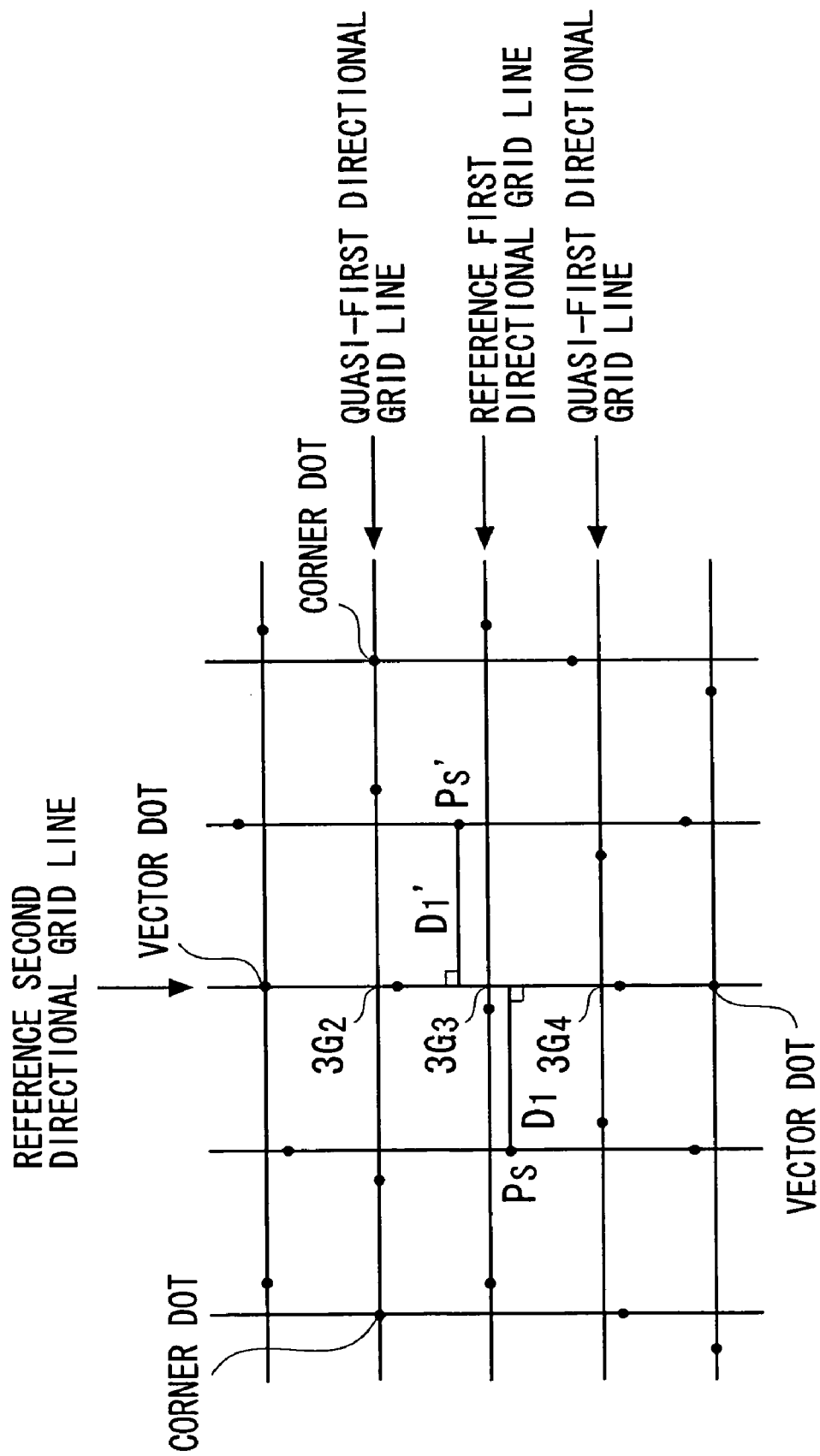
FIG. 10 is an explanatory view (4) of the reading algorithm of the dot pattern.

In the former step 12, when the candidate for the quasi-first directional grid line is found in the both sides in the clockwise direction and the counterclockwise direction, connecting the dots of the shortest distance in the clockwise directional side and the counterclockwise directional side with each other that are omitted in the step 12, this line is made into a candidate for a reference second directional grid line. Here, in the case that the distances from the candidates for the quasi-first directional grid line in the clockwise directional side and the counterclockwise directional side to the candidate for the reference first directional grid line are equal ($D_2=D_2'$), and the distances from Ps and Ps' to the reference second directional grid line are equal ($D_1=D_1'$), the candidate for the reference first directional grid line, two candidates for the quasi-first directional grid line, and the reference second directional grid line are decided. Obtaining the intersecting points between the reference second directional grid line, the reference first directional grid line, and the two candidates for the quasi-first directional grid line, they are defined as grid points $_3G_2$, $_3G_3$, and $_3G_4$. Further, each of the distances from Ps and Ps' to the reference second directional grid line is made into a first directional inter-grid distance $D_1$ (refer to FIG. 10).

(Step 15)

In the step 14, when the distances from respective candidates for the quasi-grid line to respective candidates of the reference grid line are not equal or when the distances from Ps and Ps' to the grid line in the reference second direction are not equal, raising the flag of out of the inspection object on P1 and P1', and then, with respect to the next inspection object dot, the operations of the steps 4 to 15 are carried out. However, the dot on which the flag of out of the inspection object is standing is not made into the dot of the inspection target since it does not form the reference first directional grid line.

(Step 16)

Figure 11:
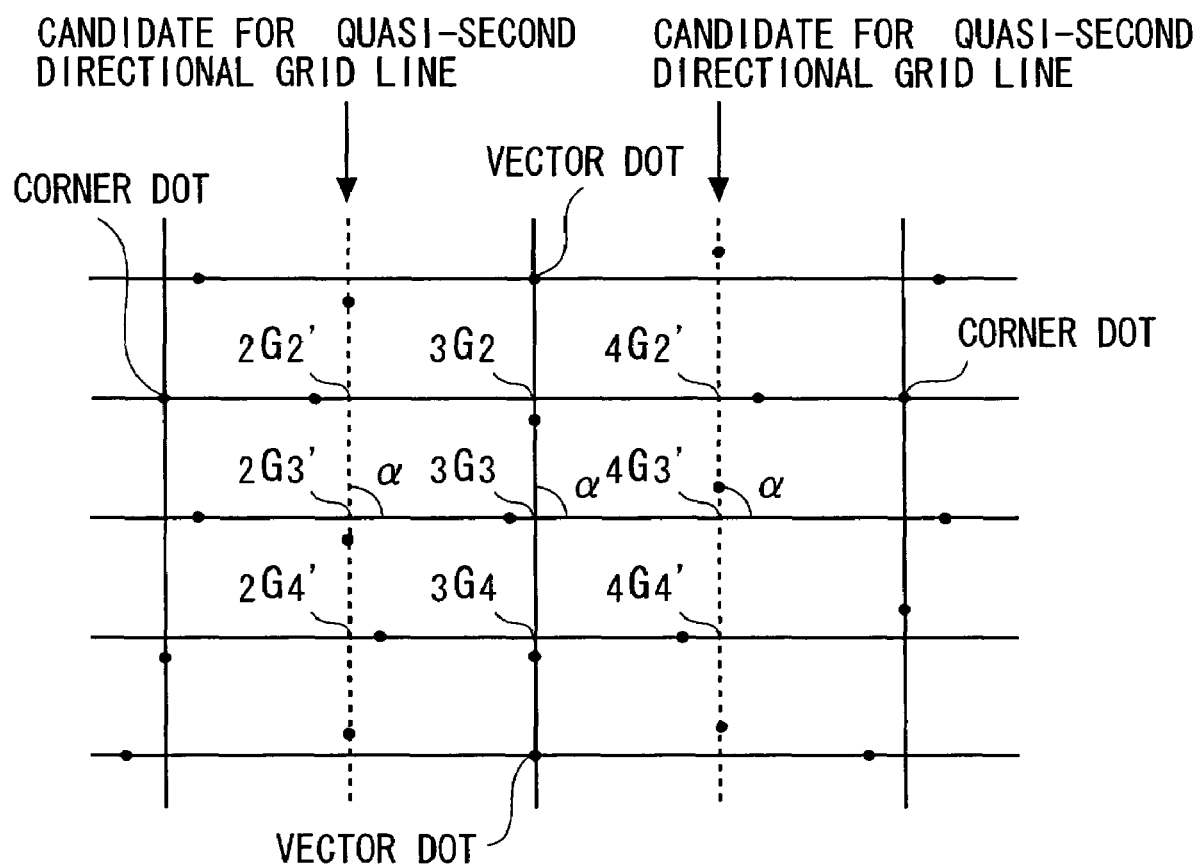
FIG. 11 is an explanatory view (5) of the reading algorithm of the dot pattern.

Drawing the candidates for the quasi-second directional grid line from Ps and Ps' which form the first directional grid line at the same angle as the reference second directional grid line, the intersecting points between the first directional grid line and two quasi-first directional grid lines are obtained to be defined as tentative grid points $_2G'_2$, $_2G'_3$, $_2G'_4$, and $_4G'_2$, $_4G'_3$, $_4G'_4$ (FIG. 11)

(Step 17)

Figure 12:
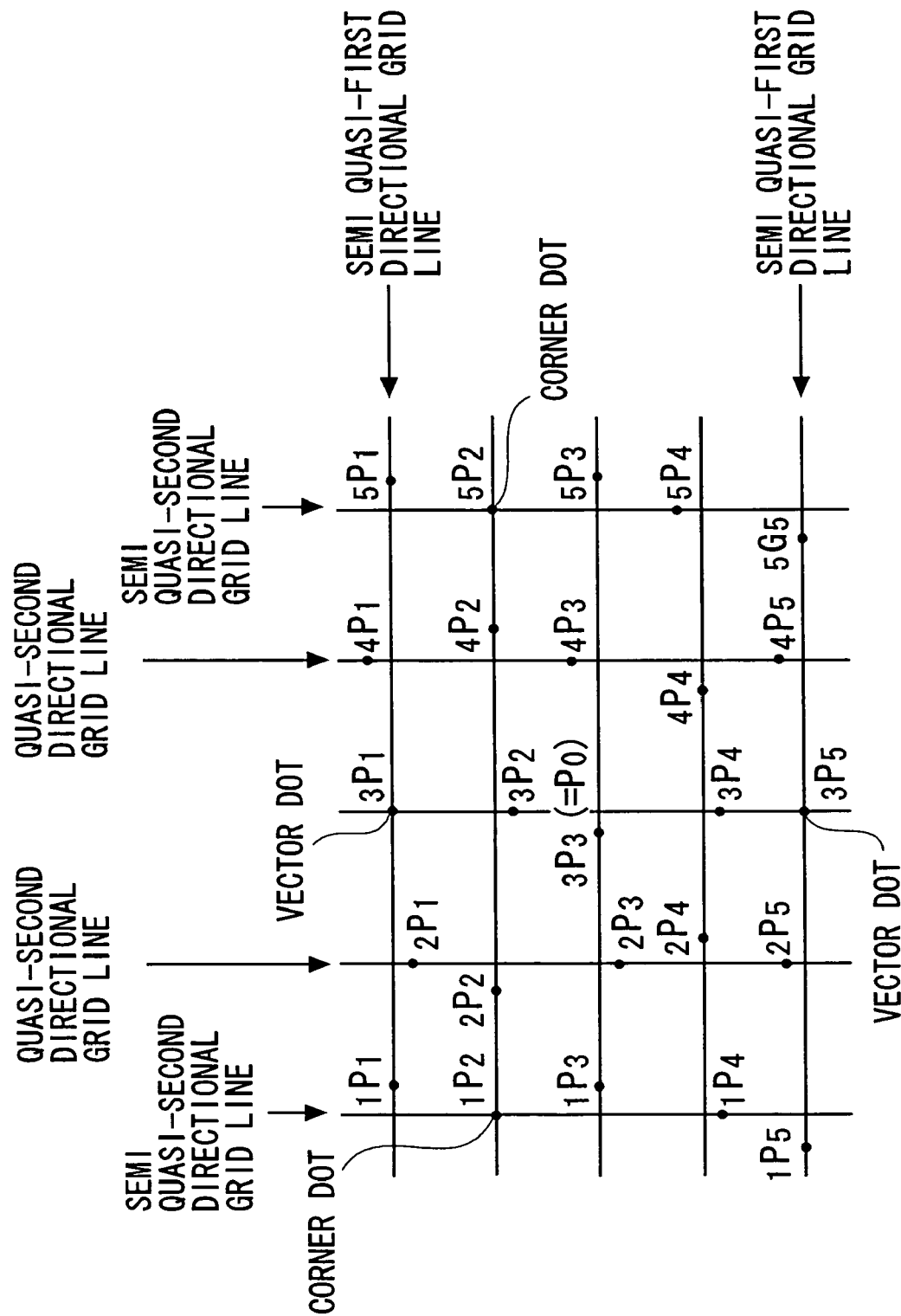
FIG. 12 is an explanatory view (6) of the reading algorithm of the dot pattern.

In the step 14 and the step 16, a total of nine grid points and tentative grid points is obtained, which encircle the grid point in the vicinity of the reference dot $P_0$. The positions of fourteen grid points around the total of nine grid points and tentative grid points are gathered in each grid line direction on the basis of the first and second directional inter-grid distances ($D_1$, $D_2$) and they are made into tentative grid points. Centering around these tentative grid points, the dot closest from the tentative grid point is searched in a spiral, fourteen dots are found in the vicinity of the tentative grid points, and then, these fourteen dots added with total of nine grid points and tentative grid points are defined as $_mP_n$ (refer to FIG. 12).

(Step 18)

At first, connecting $_2P_1$, $_2P_3$, $_2P_5$, and $_4P_1$, $_4P_3$, $_4P_5$, respectively, the lines are defined as quasi-second directional grid lines.

(Step 19)

Next, connecting $_1P_1$, $_3P_1$, $_5P_1$, and $_1P_5$, $_3P_5$, $_5P_5$, respectively, the lines are defined as semi quasi-first directional grid lines.

(Step 20)

Next, connecting $_1P_2$, $_1P_4$, and $_5P_2$, $_5P_4$, respectively, the lines are defined as semi quasi-second directional grid lines.

(Step 21)

Due to five first directional grid lines and five second directional grid lines, a total of twenty two tentative grid points are changed into the grid points and the positions of a total of twenty five grid points are obtained.

(Step 22)

The reference dot $P_0$ forms the reference first directional line to be offset from the grid point into the first direction, so that it is decided into which of the first direction or the second direction the other all dots are offset from the grid point and they have the information of 1 bit depending on the direction in which they are offset. Further, a corner dot and a vector dot are made into a grid dot having a dot overlapped on the grid point.

(Step 23)

There are one or more of the corner dot and the vector dot within a total of twenty five dots, and the grid dots of two and more at minimum and five at maximum are found including the corner dot and the vector dot.

(Step 24)

Figure 13:
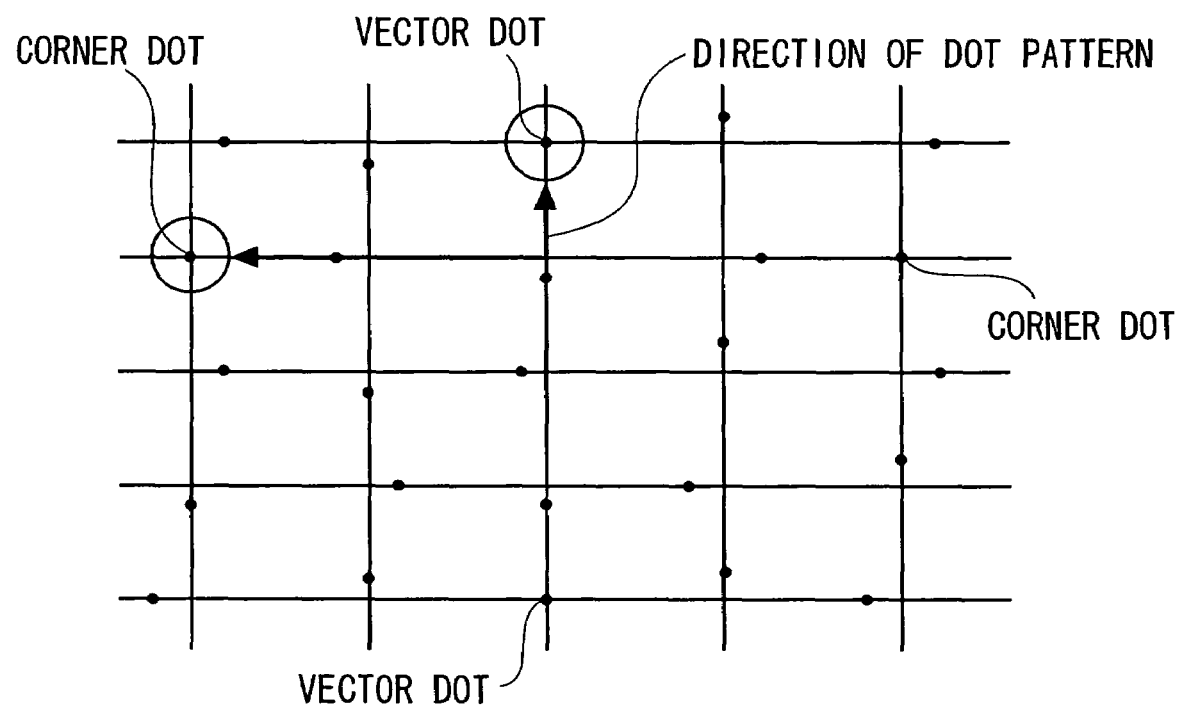
FIG. 13 is an explanatory view (7) of the reading algorithm of the dot pattern.

From among the grid dots, the grid dot closest from the reference dot $P_0$ and two grid dots closest from that grid dot are selected. In this case, these grid points necessarily become a corner dot and a vector dot. At first, a direction where a line connecting the first grid dot closet from the reference dot $P_0$ and two information dots at both adjacent sides in that grid direction is overlapped with the grid line is searched. This direction and a direction connecting the grid point near the second grid dot among the grid dots in the vicinity of the two information dots at both adjacent sides and the second grid dot are defined as another grid line directions, and it is determined whether they are spaced for two grid points or not. If the first dot satisfies this condition, the first grid dot becomes the vector dot, and the second dot becomes the corner dot. If the second dot does not satisfy this condition, the same determination is made with respect to the second grid dot. If the both dots do not satisfy the condition, it is an error. Further, the direction from the grid point where two grid lines on which the vector dot and the corner dot are overlapped intersect into the vector dot is made into the direction of the dot pattern (refer to FIG. 13).

(Step 25)

Due to the vector dot and the corner dot, the position of the other vector dot and corner dot is gathered, and then, it is confirmed whether all of the grid dots that are found at that position in the step 23 are overlapped with each other or not. If they are not overlapped with each other, it is an error.

(Step 26)

Figure 14:
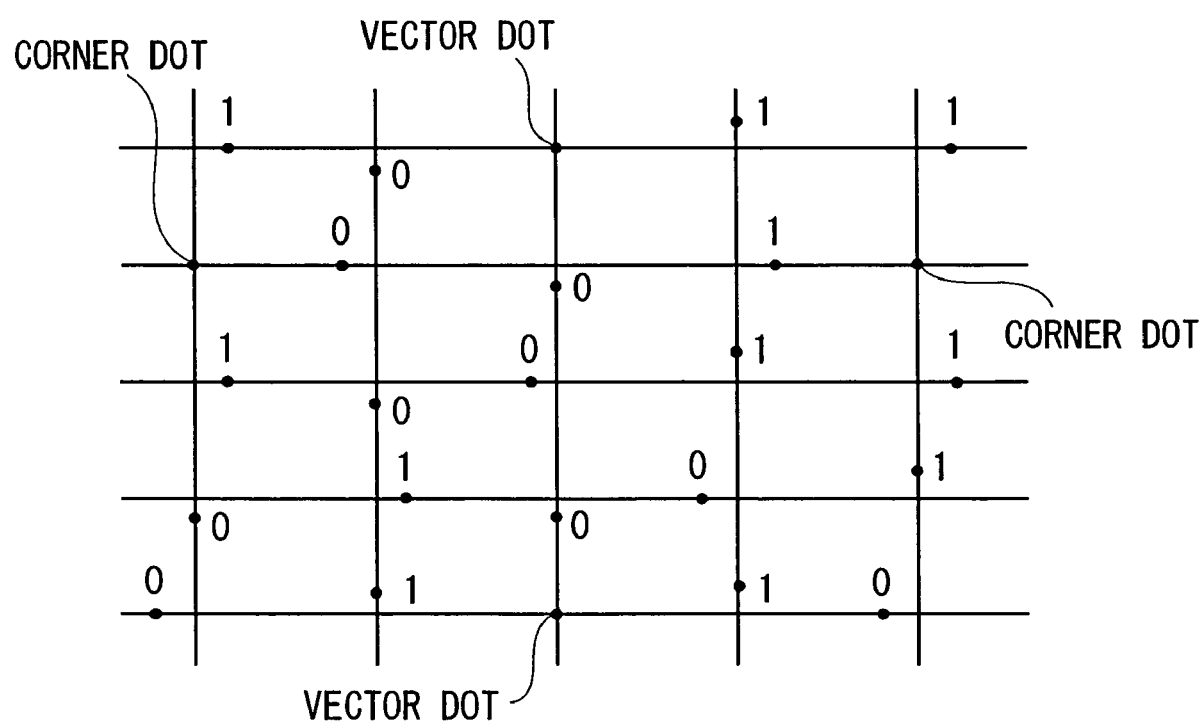
FIG. 14 is an explanatory view (8) of the reading algorithm of the dot pattern.

From the above, the direction of the dot pattern and the direction in which all of the information dots are offset from the grid point are found. Then, defining the right direction 90° from the direction of the dot pattern as "1" and defining its reversed direction as "0", the information for one block is calculated. Further, by obtaining an angle made by the vertical direction at the center of photographing and the direction of the dot pattern, this angle can be made into an information parameter. In FIG. 14, an angle information parameter is $\theta=0°$.

(Step 27)

Figure 15:
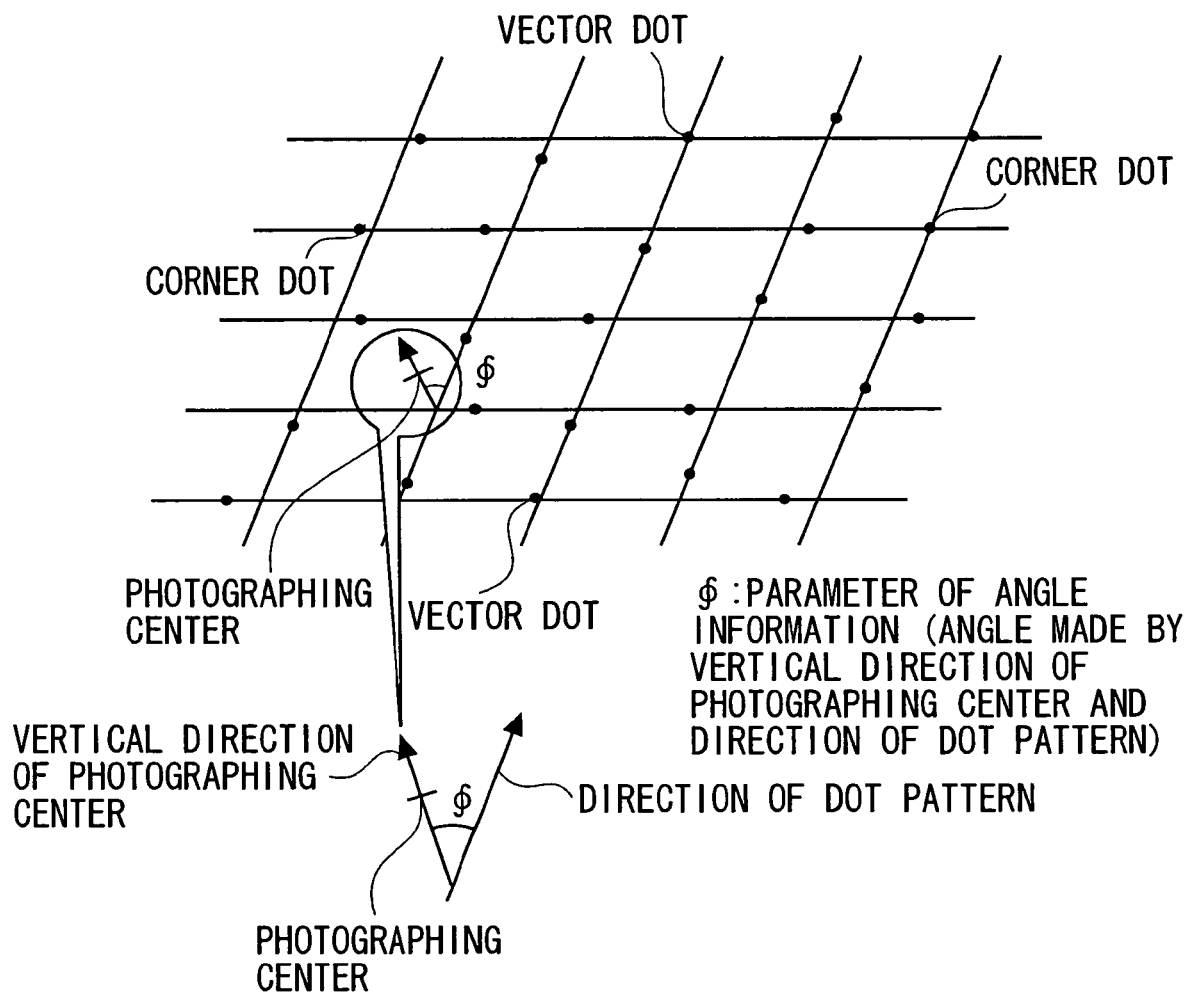
FIG. 15 is an explanatory view (9) of the reading algorithm of the dot pattern.

FIGS. 1 to 9 show an example that the dot pattern is read from the oblique direction with the optical reading apparatus 801 inclined and the dot pattern is modified into an oblong. Also in the case that an angle is made by the vertical direction at the center of photographing of the optical reading apparatus and the direction of the dot pattern and the dot pattern is modified into a diamond shape, the above-described steps 1 to 26 can be appropriately put into execution (refer to FIG. 15).

(Step 28)

In the data calculation for one block, in the case of the data in a code form, the same code is recorded in the data of any block in any area, so that it is not always necessary that the bit information of the dot encircled by four corner dots is obtained. If the bit information (1 or 0) of each dot corresponding to one block is obtained across a block, the data for one block can be calculated.

Further, in the case of a xy coordinate format, by carrying out correction and interpolation due to an incremental value of a xy coordinate of the adjacent block and the center position of photographing, an accurate coordinate value at the center of photographing is calculated. In other words, when the data in the block means the xy coordinate, at first, from the positional relation between the grid dot and the vector dot, it is determined where the center of photographing is located in the block. Next, correcting the data of the part referred from the adjacent block included in the photographing range, the data at the part not included in the range of photographing of the photographing center block is interpolated. Thereby, the xy coordinate of this block (specifically, the xy coordinate of the block in which the photographing center is included) is obtained.

This xy coordinate means xy coordinate at the center of the block, and by linearly interpolating the amount of misalignment between the position of the block center and the photographing center and the increment and decrement amount of the xy coordinate between the blocks, the true xy coordinate of this block can be obtained.

Further, the information input and output method using the dot pattern of the present invention is not limited to the above-described embodiment, and it is obvious that various modifications can be added to the present invention without departing from the scope thereof.

For example, in the case of using the dot pattern as a back ground of printing, the dot may be arranged on the grid point itself (a dummy dot pattern). Such a dot pattern can be used in a borderline region as a line art can be recognized (a borderline region among mask images). In addition, this dummy dot pattern can be made into the back ground of printing. In this case, when the dummy dot pattern is read by the optical reading apparatus, there is no information dot and the error output is carried out. Due to this error output, it is possible to recognize that the dummy dot pattern is the back ground and music such as back ground music (BGM) or warbling of small birds according to the back ground or the like can be outputted.

In addition, according to the embodiment, the vector dot (refer to FIG. 16) indicates a direction of the information block of 4×4 grid blocks (grids), however, by using this vector dot, the reading direction of the optical reading apparatus can be recognized. Therefore, it is possible for the dot pattern of the same information block to have a different meaning depending on the reading direction. In other words, by reading the same dot pattern with the optical reading apparatus being rotated 90 degrees, 180 degrees, or 270 degrees around the reading optical axis, the position of the vector dot is also a horizontal direction or a lower direction with respect to the information block on the image memory. Therefore, after reading the dot pattern in the information block, the output (the voice or the like) may be changed in accordance with the directional information obtained from the position of the vector dot. For example, the dot pattern of the present invention is printed on each square of a cross word puzzle, then, rotating the reading surface of the optical reading apparatus 90 degrees around the optical axis, a hint of a word in a longitudinal direction and a hint of a word in a lateral direction may be displayed and outputted (the voice output) separately. Further, the technology to recognize a rotation angle when the optical reading apparatus reads the dot pattern by using the vector dot has been described in the above with a case that the optical reading apparatus is rotated by units of 90 degrees, however, about 5 degrees as the minimum rotation angle, the angle can be recognized.

Figure 16:
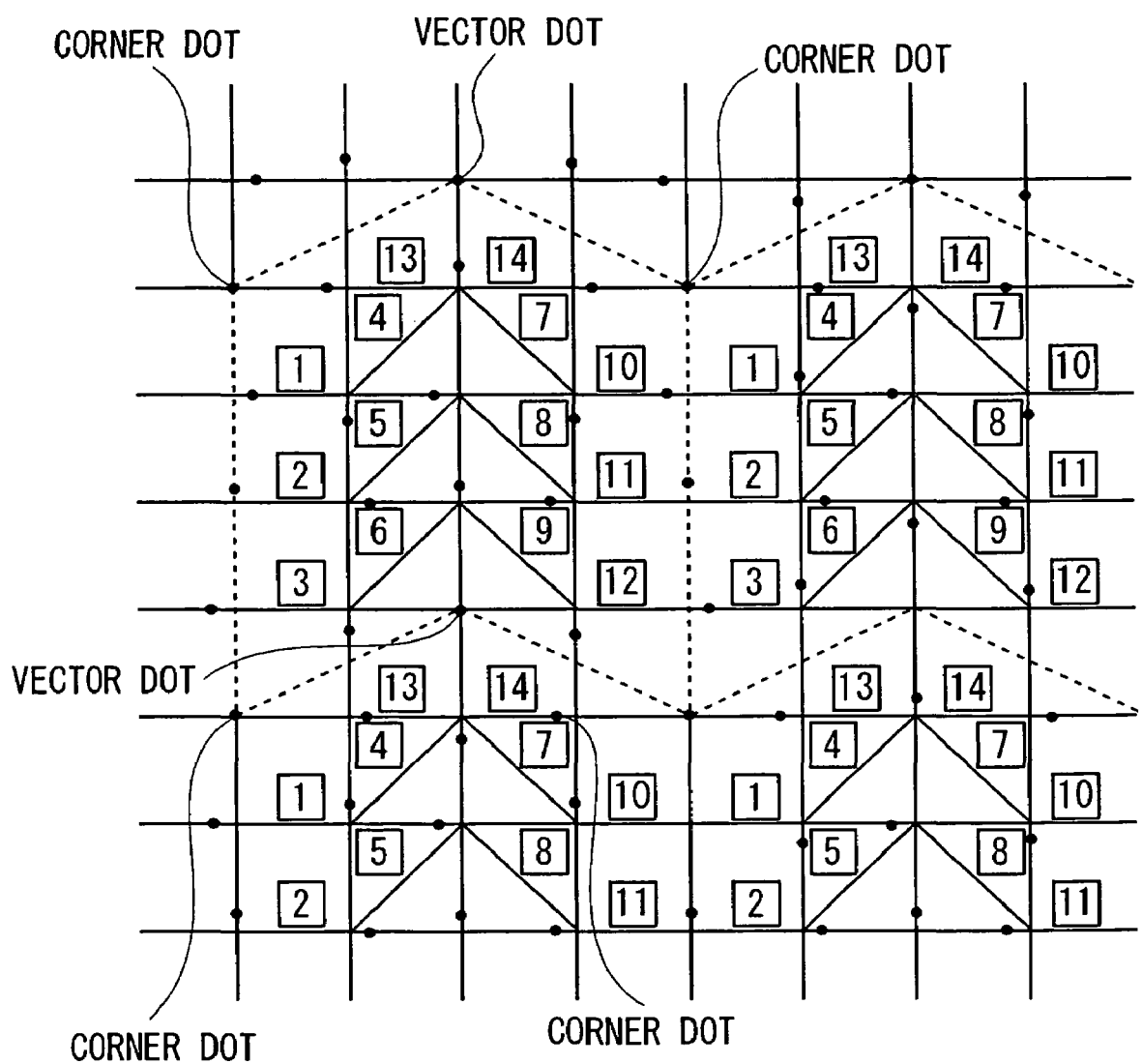
FIG. 16 is an explanatory view (10) of the reading algorithm of the dot pattern.

In addition, in FIG. 16, the vector dot is solely provided; however, the information dot itself may be defined as one vector dot. In other words, upon generation of the dot pattern according to the difference method, by controlling the initial value, the arranging position of the dot (for example, the dot of the circled numeric value 8 in FIG. 17) can be controlled. As a result, the information dot of such a specific position can be used as the vector dot.

In this way, the vector dot and the information dot can be shared, so that the information amount can be increased.

Then, since the vector dot is located solely in FIG. 4 and FIG. 16, the difference should be detected with the reading order being in the oblique direction like [4] to [9] (refer to FIG. 4 and FIG. 16). However, when the information dot and the vector dot are shared, as shown in FIG. 17, the difference may be read in approximately a horizontal direction, and this leads to simplification of the search algorithm.

Figure 17:
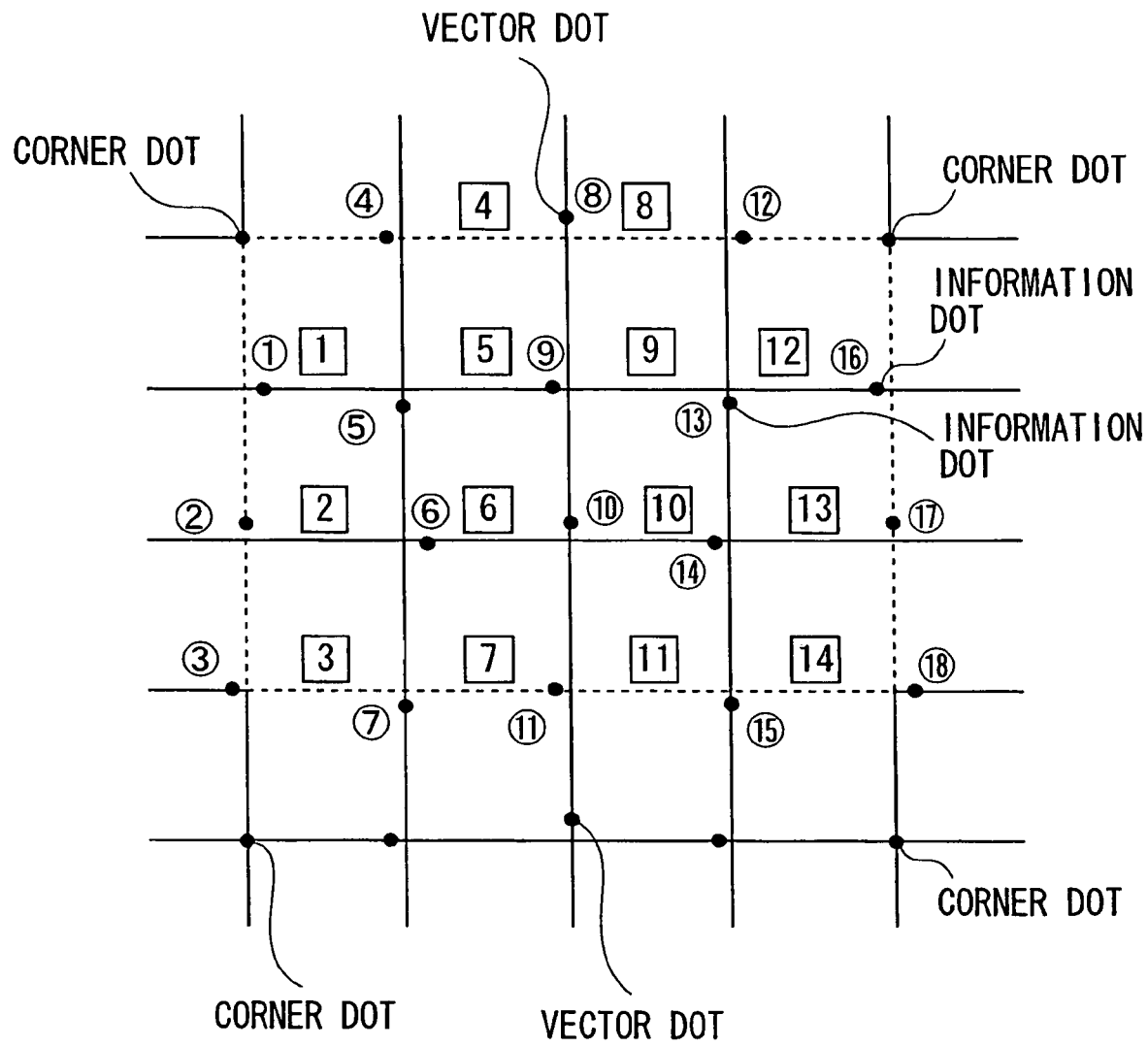
FIG. 17 is an explanatory view of a modification of the reading algorithm of the dot pattern.

Further, FIG. 18 shows a comparison among the value of the information bit, the value of the security table, and the true value calculated from the information bit value and the security table value of the dot pattern shown in FIG. 17.

In other words, the security table is provided on the storage means or the like of the optical reading means, and by adding values $K_1$ to $K_{14}$ of the security table to the value of the information bit read by the difference (the upper stage of FIG. 18), true values $T_1$ to $T_{14}$ can be calculated.

According to the embodiment, the number of the grid block is decided by one unit of information made of 4×4, however, it is obvious that this block number may be changed freely.

INDUSTRIAL APPLICABILITY

By applying the information input and output method using the dot pattern according to the present invention into a printing medium such as a picture book and a sticker or the like, other character information, image information, and voice information or the like can be further added to the printing information of a paper medium.

In addition, according to the present invention, by using the dot pattern of the printing medium, the dot pattern can be a substitute for a tablet input.

What is claimed is:

1. An information input and output method;
wherein an optical reading apparatus reads a dot pattern which is formed on a medium and in which information dots are arranged being misaligned at predetermined intervals in a x direction or a y direction from a grid point on a virtual grid line provided at predetermined intervals in a xy direction;
the optically read dot pattern is deployed on an image memory;
how to misalign each information dot from the grid point into the x direction or the y direction is recognized by a bit map calculation on the image memory;
a value is given to each information dot corresponding to the misalignment;
a difference of the values among the adjacent information dots is calculated to be defined as the bit information; and
a dot pattern is used, which outputs a bit information group in a predetermined area as coordinate information or code information.

2. The information input and output method using a dot pattern according to claim 1,
wherein the misalignment at predetermined intervals from each grid point in the x direction or the y direction on the virtual grid line is alternately generated for every adjacent information dots.

3. The information input and output method using a dot pattern according to claim 1,
having a corner dot arranged on a grid point for each of the predetermined number of grid areas; and registering the coordinate information or the code information in the area encircled by the corner dot as the predetermined area.

4. The information input and output method using a dot pattern according to claim 3,
wherein a vector dot meaning the direction of the predetermined area is arranged outside of the area encircled by the corner dot or on the grid point in the area.

5. The information input and output method using a dot pattern according to any one of claims 1, 2, 3 or 4,
wherein a security table having a key parameter corresponding to each bit stored therein is provided in a storage apparatus with respect to the outputted bit information group, and a true value is calculated by calculating each bit information by the key parameter.

6. An information input and output method;
wherein an optical reading apparatus reads a dot pattern which is formed on a medium and in which information dots are arranged being alternately misaligned at predetermined intervals in a x direction or a y direction for each of the adjacent grid points on a virtual grid line provided at predetermined intervals in a xy direction;
the optically read dot pattern is deployed on an image memory;
the alternately arranged information dots are searched and the grid line in the x direction and the y direction is recognized on a bit map;
a coordinate of each grid point is recognized on the bit map;
how to misalign each information dot from the grid point into the x direction or the y direction is recognized by a bit map calculation;
a value defined in advance is given to each information dot corresponding to the misalignment;
a difference of the values among the adjacent information dots is calculated to be defined as the bit information;
a bit information group in a predetermined area is outputted;
a key parameter is read from a security table having the key parameter corresponding to each bit stored therein with respect to the bit information group, and a true value group is calculated by calculating each bit information by the key parameter; and
a dot pattern outputting the code information corresponding to the true value group or the coordinate information group on the medium surface is used.

7. A dot pattern generating method;
wherein information dots are arranged being alternately misaligned at predetermined intervals in a x direction or a y direction for every adjacent grid points on a virtual grid line provided at predetermined intervals in a xy direction on a medium;
a bit information group is calculated by calculating a key parameter read from a security table with respect to a true value group;
an initial dot to be arranged on an initial grid line in the x direction or the y direction is decided by using an arbitrary random number;
the initial dot is arranged on the basis of a misalignment rule from the grid point set in advance;
the bit information value is added to the value meant by the initial dot to calculate a value of a dot to be arranged on a second grid line;
each dot is arranged on the second grid line on the basis of the misalignment rule from the grid point set in advance; and
arrangement of a dot on a grid line n is repeated by rotation on the basis of a dot on a grid line n−1.

* * * * *